Nov. 27, 1951  D. D. AUSTIN, SR., ET AL  2,576,497
WORK LOCATING AND DRIVING MECHANISM
Filed Feb. 10, 1947  5 Sheets-Sheet 2
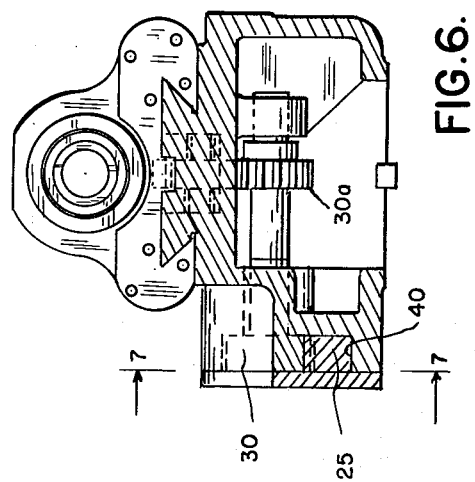
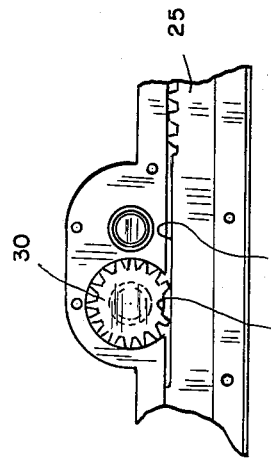
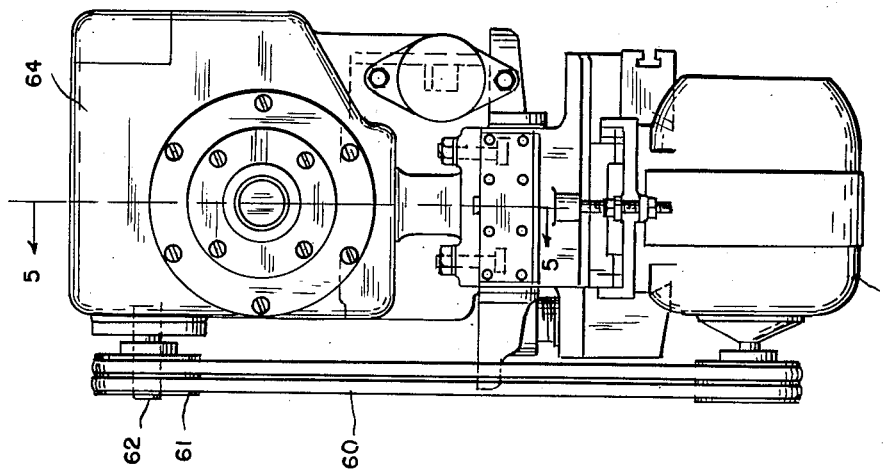
INVENTORS
DONALD D. AUSTIN SR.
KENNETH J. DAVIS
BY
*Whittemore, Hulbert*
*& Belknap*
ATTORNEYS Nov. 27, 1951  D. D. AUSTIN, SR., ET AL  2,576,497
WORK LOCATING AND DRIVING MECHANISM
Filed Feb. 10, 1947  5 Sheets-Sheet 3
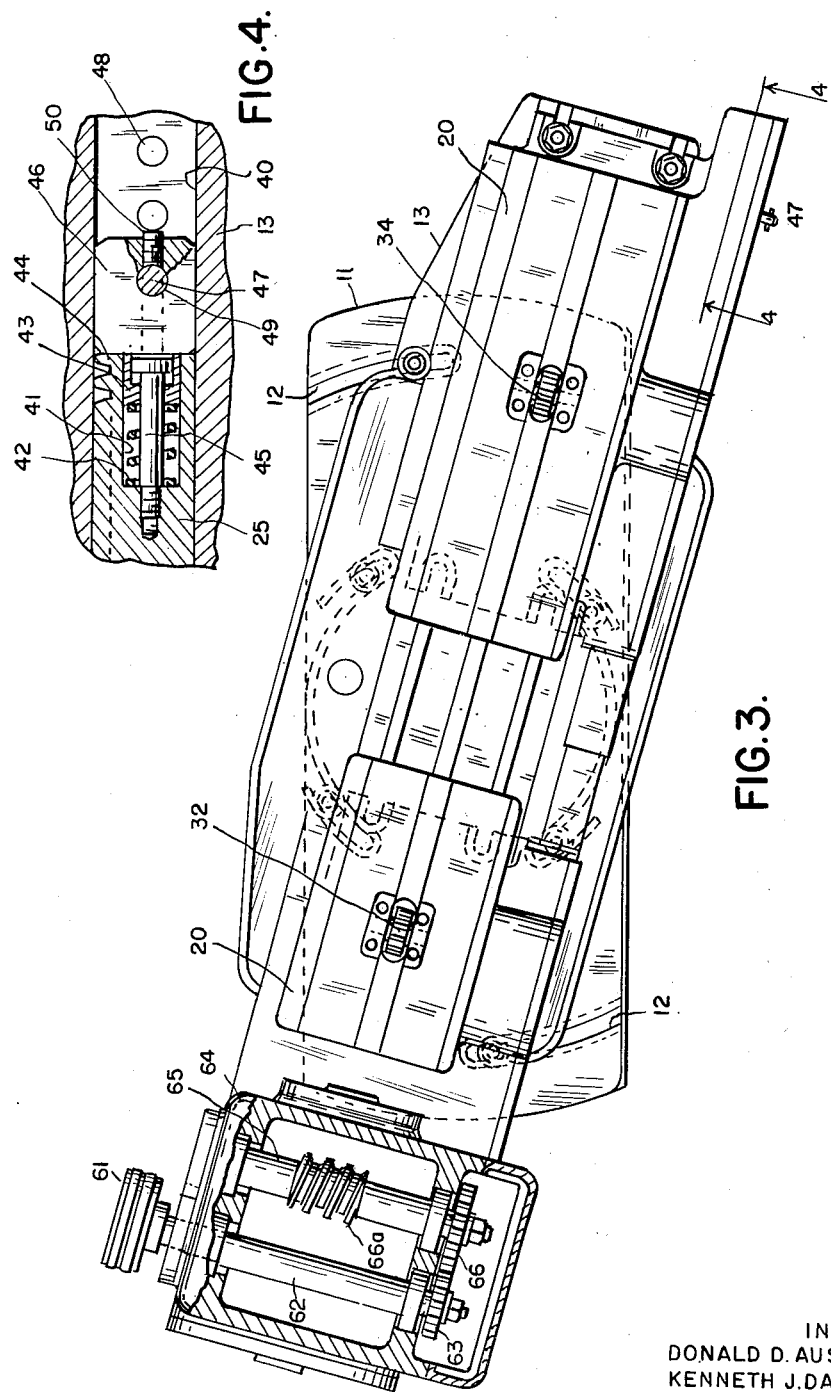
INVENTORS
DONALD D. AUSTIN SR.
KENNETH J. DAVIS
BY *Whittemore, Hulbert*
*& Belknap*
ATTORNEYS Nov. 27, 1951 D. D. AUSTIN, SR., ET AL 2,576,497
WORK LOCATING AND DRIVING MECHANISM
Filed Feb. 10, 1947 5 Sheets-Sheet 4

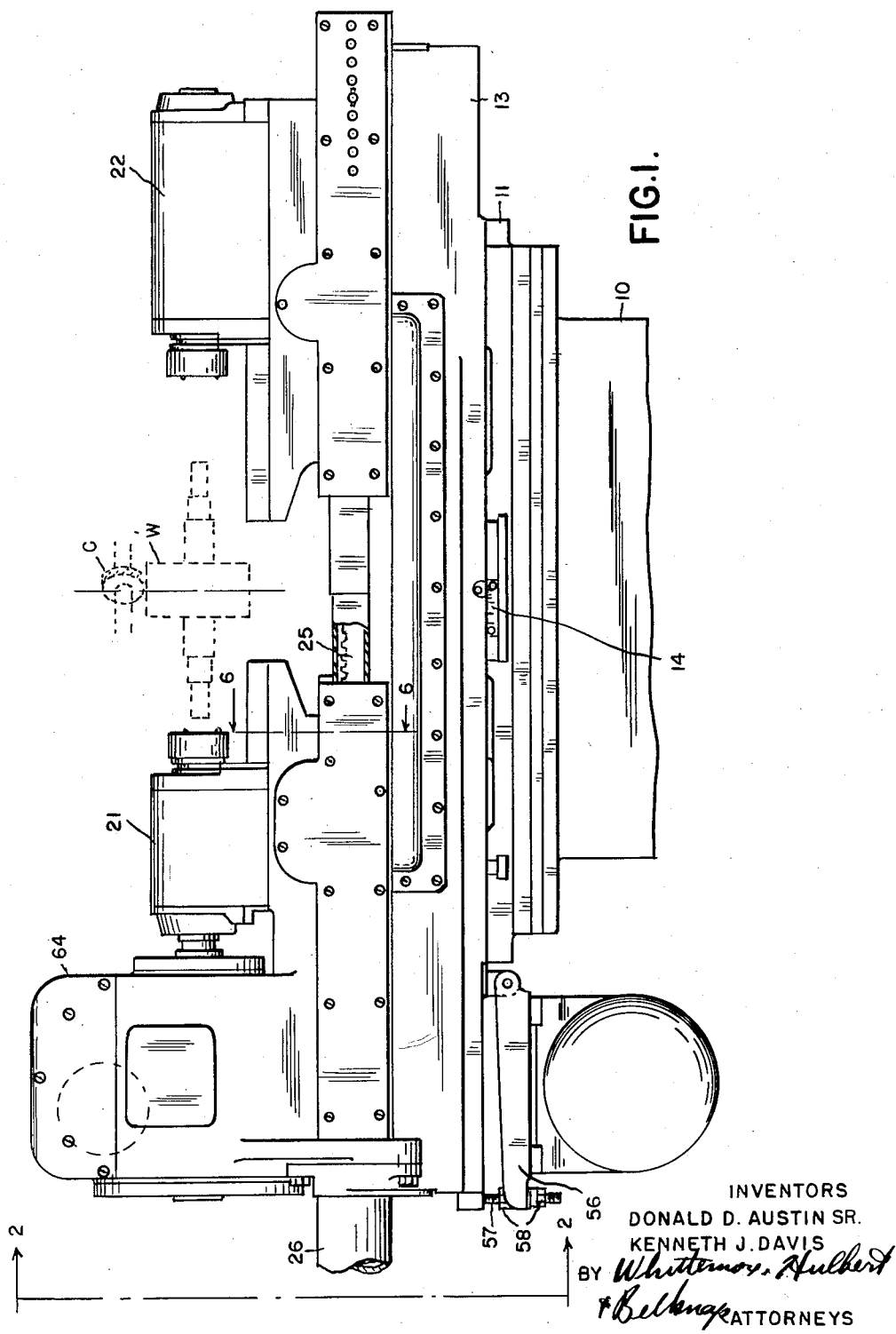

INVENTORS
DONALD D. AUSTIN SR.
KENNETH J. DAVIS
BY Whittemore, Hulbert
& Belknap
ATTORNEYS

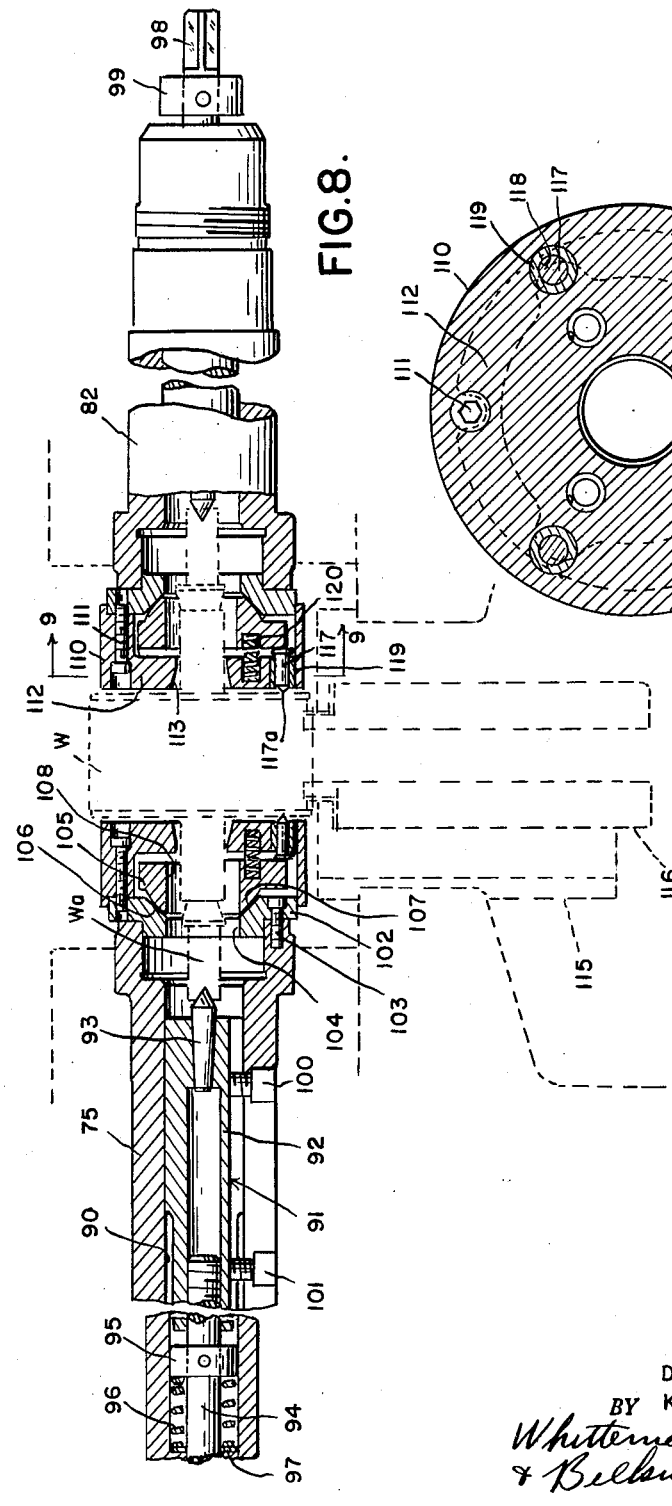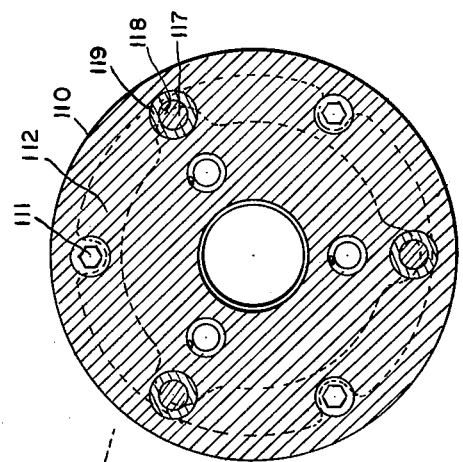

Patented Nov. 27, 1951

2,576,497

UNITED STATES PATENT OFFICE 2,576,497

WORK LOCATING AND DRIVING MECHANISM

Donald D. Austin, Sr., and Kenneth J. Davis, Detroit, Mich., assignors to National Broach and Machine Company, Detroit, Mich., a corporation of Michigan Application February 10, 1947, Serial No. 727,492

21 Claims. (Cl. 90—1.6)

The present invention relates to work locating and driving mechanism.

In the past a serious problem has been presented by certain shapes and types of work pieces to be machined in that means for gripping the work piece to effect turning thereof had a tendency to impose stresses on the work piece, as for example bending of a shaft, which resulted in ultimate machining errors. In many types of work pieces it is essential to hold final dimensions to .001 inch or less and any slight error traceable to the mechanism for holding and driving the work piece is or may be additive to other errors in the machine.

In accordance with the present invention, mechanism is provided for gripping the end surfaces of a work body, even though such end surface may be irregular, in such a manner as to impose no side thrust or distortion on the work piece.

Broadly speaking, the mechanism comprises means for initially locating the work piece with its axis aligned with the axis of rotation of the machine and for thereafter gripping the end surfaces of the body of the work piece in such a manner as to impose no radial thrusts upon the work piece while at the same time effecting a sufficiently firm engagement with the work piece so that driving torque may be applied thereto sufficient to effect subsequent machining operations such as turning, grinding, shaving, milling or the like.

It is an object of the present invention to provide work locating and driving mechanism effective initially to position a work piece coaxial with the axis of the rotation of the work driving means and thereafter while supporting the work in its accurately located position, to effect a strong gripping of the work piece without at the same time imposing distorting radial stresses thereon.

More specifically, it is an object of the present invention to provide work locating and driving mechanism effective, first, to locate the work piece and, second, to establish a strong driving connection therewith without imposing distorting stresses thereto.

It is a further object of the present invention to provide work locating and driving mechanism characterized by the gripping of the work piece taking place at the sides of the work body so as to leave the entire peripheral surface free for machining in a single pass.

It is a further object of the present invention to provide a machine tool having means for initially locating a rotary work piece and for thereafter moving work driving elements axially into engagement with opposed side surfaces of the work piece to effect a rigid driving engagement therewith without introducing distorting stresses thereto.

It is a further object of the present invention to provide improved work supporting mechanism which is simple in design and operation and economical to construct.

It is a further object of the present invention to provide work supporting and driving mechanism effective to hold and drive work pieces from their opposed end surfaces without imposing distorting stresses thereto.

It is a feature of the present invention to provide work gripping mechanism comprising a plurality and preferably three contact elements rigidly connected together for complemental movement.

It is a further feature of the present invention to provide work gripping mechanism comprising a plurality and preferably three contact elements having ends movable into engagement with a side surface of a work piece, and a rigid backing plate contacting the opposite ends of all of said elements, in which said plate is universally movable to permit compensating complementary movement of said elements while at the same time retaining the advantages of a rigid support therefor.

Other objects and features of the invention will become apparent as the description proceeds, especially when taken in conjunction with the accompanying drawings, wherein:

Figure 1 is a front elevation of a machine embodying the present invention;

Figure 2 is an end elevation of the machine looking in the direction of the arrows 2—2 of Figure 1;

Figure 3 is a plan view of the machine with the head and tailstocks removed;

Figure 4 is an enlarged fragmentary section on the line 4—4 of Figure 3;

Figure 6 is a fragmentary section of the machine taken on the line 6—6 of Figure 1;

Figure 7 is a fragmentary sectional view taken on the line 7—7 of Figure 6;

Figure 8 is a horizontal section through the rotary spindles; and

Figure 9 is an enlarged section on the line 9—9 of Figure 8.

Figure 5:
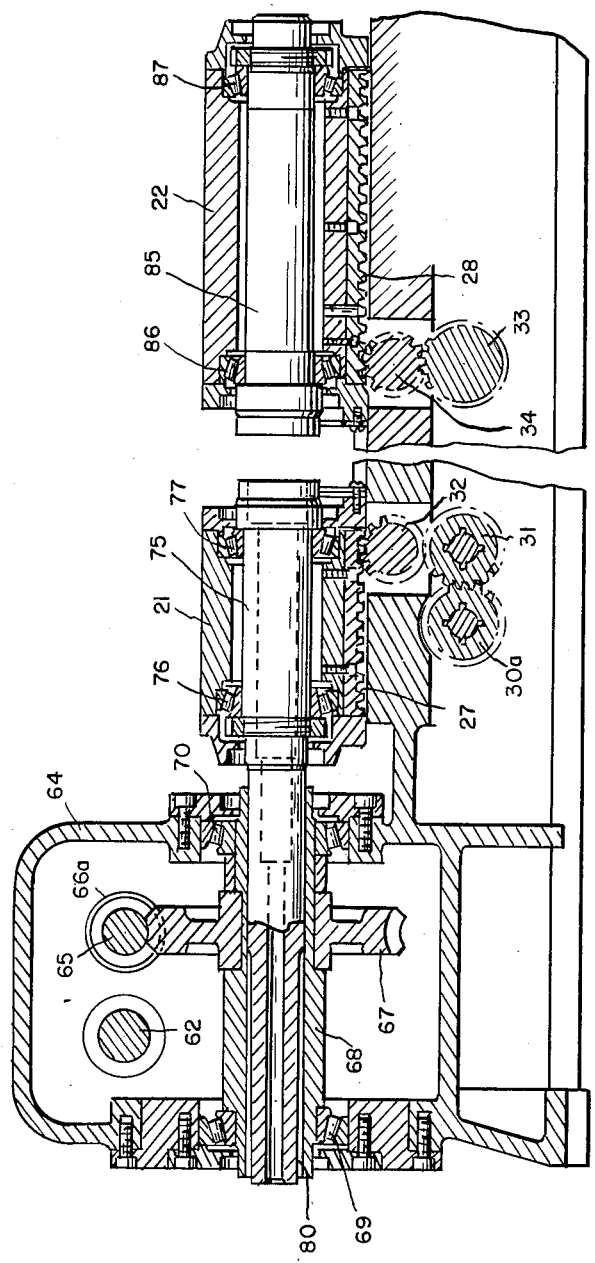
Figure 5 is a vertical section through the machine looking in the direction of the arrows 5—5 of Figure 2.

For illustrating the application of the present invention there is shown herein a machine for finishing the peripheral surface of a work piece, such for example as an electric rotor W. In the particular machine illustrated, the surface of the work piece W is machined by a shaving operation effected by a rotary shaving cutter C. The cutter in the present machine is arranged with its axis crossed to the axis of the work piece W to effect a particular machining operation which forms no part of the present invention.

It will be appreciated that the present invention is applicable to any machine tool in which it is desired to accurately locate and grip a work piece, and that the invention is thus equally applicable to lathes, milling machines, grinders, or in fact any type of machine in which a rotary work piece is employed.

The machine which has been chosen in the present instance for purposes of illustration, however, comprises a base 10 having at its upper end a flat table 11 provided with partial circular ways 12. Mounted in the circular ways 12 for rotation about a central vertical axis is a swivel base 13. The base 13 is mounted for adjustment about the vertical axis in order to effect a controlled crossed axes relationship between the work piece W and a cutter C which is supported by an overhanging support not shown in the present figures. A suitable scale as indicated at 14 is provided to give a direct reading of the angularity of the swivel base 13.

The upper surface of the swivel base 13 is provided with aligned ways 20 for receiving and guiding the driving headstock 21 and the tailstock 22. Means for effecting movement of the headstock 21 and tailstock 22 toward and away from each other comprises a rack 25 indicated in Figures 1, 6 and 7. Preferably non-positive driving means, such for example as an air cylinder, a portion of which is indicated at 26 in Figure 1, is provided for sliding the rack 25.

As best seen in Figure 5, the lower portions of the headstock 21 and the tailstock 22 are provided with rack teeth as indicated at 27 and 28, respectively, and driving connection between the rack portions 27 and 28 and the rack 25 is established by pinions. The headstock 21 is driven through a pinion 30 which meshes with the rack 25, a pinion 30a coaxial with the pinion 30 as seen in Figure 6, a reversing pinion 31 and a drive pinion 32 which engages the rack 27. The tailstock 22 is driven from the rack 25 through a pinion (not shown) which meshes with the rack 25, and a second pinion 33 coaxial therewith which meshes with a drive pinion 34, the drive pinion 34 in turn meshing with and driving the rack 28.

In the particular machine shown, the work piece is such as to require that the travel of the headstock 21 and tailstock 22 shall be different and in order to effect a differential travel of the two stocks through a single rack driving mechanism, the rack 25 and pinion 30 will be modified as shown in Figure 7. Thus the pinion 30 has a short section 38 in which teeth are omitted and a section of the rack, as indicated at 39, in which teeth are omitted, the parts 38 and 39 being shaped so as to effect holding of the pinion 30 in non-rotative position by the non-toothed portion 39 of the rack 25. When the rack has moved to a position in which its teeth come into position opposite the pinion 30, the teeth of the rack 25 mesh with the teeth of the pinion 30 and rotation is imparted thereto, thus initiating traverse of the headstock 21.

As best seen in Figure 4, means are provided for limiting motion of the rack 25 to the right and also to provide a cushion therefor. A suitable way 40 is provided in the swivel base 13. The end of the rack 25 opposite to its connection to the air cylinder 26 is recessed as indicated at 41 for the reception of a buffer spring 42. A cup 43 is slidable in the recess 41 and is urged outwardly therefrom by the compression spring 42. Outward movement of the cup 43 beyond the end 44 of the rack is limited by a headed stud 45. An abutment block 46 is provided in the way 40 and is adapted to be retained in adjusted position therein by a dowel pin 47 which passes through one of a plurality of openings 48 located in the swivel base 13 and passes through an opening 49 formed in the block 46. A clamping screw 50 is provided for engaging the dowel 47 and preventing the parts being loosened by continued operation of the machine. The opening 49 in the block 46 is eccentrically located therein so as to effect different positions of adjustment of the block 46 by the process of reversing the block end for end and reinserting in the way 40.

Driving means for effecting rotation of the work piece is carried by the swivel base 13 and comprises a motor 55 mounted on a pivoted base 56 which may be adjusted by means of a bolt 57 and clamping nuts 58. The motor 55 connects with V belts 60 to a sheave 61 which rotates a shaft 62. As best seen in Figure 3, the shaft 62, which extends across the drive transmission housing 64, carries a change gear 63. A second shaft 65 parallel to the axis of the shaft 62 is provided with a gear 66 which is driven from the gear 63. Intermediate its ends in the drive transmission housing, the shaft 65 is provided with a worm 66a. Referring now to Figure 5, the worm 66a meshes with a worm gear 67 which is keyed to an internally splined sleeve 68 which is mounted for rotation in the drive transmission housing by bearings 69 and 70.

The power headstock 21 has journaled therein a spindle 75, bearings 76 and 77 being provided therefor. The end of the spindle 75, as indicated at 80, extends within the splined sleeve 68 so that rotation of the sleeve 68 imparts rotation to the spindle 75 while at the same time the spindle is axially movable with respect to the drive transmission housing 64.

The tailstock 22 is provided with a spindle 85 in which are mounted bearings 86 and 87 therein and which is substantially similar to the spindle 75 except that no means are provided for applying power for rotation thereof.

Referring now to Figures 8 and 9, there is illustrated the mechanism which initially positions and effects driving engagement with the work piece W without imposing distorting lateral stresses thereon. Insofar as this drive mechanism is concerned, it is identical in the spindles 75 and 85 and accordingly the description of a part associated with one spindle will apply with equal force to the corresponding part associated with the other spindle. The spindle 75 is provided with an axially extending bore 90 in which is slidably mounted a work locating center indicated generally at 91 which comprises an internally threaded member 92 having a locating center pin 93 at one end thereof and receiving a threaded center adjusting screw 94. Keyed to the screw 94 is an abutment 95 against which is seated a compression spring 96, the compression spring 96 at its opposite end bearing against a spring seat 97 located in the bottom of the bore 90. The screw 94 is provided at its outer end with a squared end and a keyed abutment 99, as indicated at 98 (shown in conjunction with spindle 85). It will be apparent that rotation of the screw 94 will effect adjustment of the center pin 93 longitudinally of the bore 90 to permit its location in proper relation to pick up the ends of a shaft such as the shaft $Wa$ of the work piece W. The member 92 is retained against rotation in the spindle 75 by screws 100 and 101.

Located at the forward open end of the spindle 75 is an annular member 102 rigidly secured thereto by bolts 103. The member 102 is provided with an enlarged central opening 104 to permit the passage of the shaft $Wa$ of the work piece therethrough. The forward face of the member 102 adjacent the opening 104 is shaped to cooperate with a backing or compensating plate 105 so as to provide for universal adjustment between the member 102 and the backing plate 105. This arrangement may be effected by providing a conical surface 106 at the forward face of the member 102 and providing a spheroidal rear surface 107 to the backing plate 105, the center of curvature of which is in the plane of the flat front face of the backing plate. The backing plate 105 is further provided with an enlarged central opening 108 to permit passage therethrough of the work shaft $Wa$. Rigidly secured to the member 102 and in overlying relation to the forward end of the spindle assembly 75 is a cap 110, bolts 111 being provided for effecting rigid engagement therebetween. The cap 110 is provided with a face plate portion 112 overlying the backing plate 105. The face plate 112 is provided with a central tapered opening 113 for the reception of the work shaft $Wa$. Means are provided for initially supporting the work piece in approximate position slightly below its ultimate working position, and these means may conveniently take the form of rails 115 which are inclined downwardly and forwardly toward the front of the machine and upon which the shafts $Wa$ at opposite ends of the work piece W are adapted to rest. Latch means comprising pivoted arms 116 are provided and are adapted to engage the work piece to prevent its forward rotation down the inclined rails 115. The tapered openings 113 are effective as the headstocks 21 and 22 move toward a work piece initially positioned on the rails 115 to guide the spindles $Wa$ into the tapered openings 113. The arrangement is such that as the work shafts $Wa$ move through the openings 113 in the face plates 112 the work piece is picked up slightly from its initial support. Further movement of the headstocks 21 and 22 toward each other results in the center pins 93 engaging locating recesses in the ends of the work shafts $Wa$ and in supporting the work piece in accurately predetermined position with its axis coaxial with the axis of the spindles 75 and 85.

It will be appreciated that the structure thus far described is effective to position the work piece accurately in a final working position but that so far no means have been described which will be effective to grip the work piece to effect rotation thereof. In the past great difficulty has been encountered in devising means for gripping the work piece without imparting lateral or unbalanced stresses thereto which effect distortion and result in ultimate errors in finished surfaces. In accordance with the present invention, each of the face plates 112 of the cap 110 is provided with a plurality and preferably three openings 118 which are spaced at 120° intervals about the axis thereof. Openings 118 are provided with accurately formed bushings 119 in which are slidably mounted work-engaging elements or pins 117. Pins 117 are preferably provided with ends 117a adapted to bite into the opposed side surfaces of the body of the work piece W. For this purpose the ends 117a may be pointed or if preferred they may be provided with a cup-like formation. In some cases it may even be feasible to employ each of the elements 117 as abutment means for actuating a further plurality of contact elements. Thus, for example, each of the pins may engage a second swivel backing element which in turn will actuate two or three contact elements and thus the points of contact with the work piece may be increased from three to six or nine. This multiplication of contacts may of course be carried even further. However, in most cases it is found that three contact elements 117 are sufficient.

It is important to note that each of the pins or contact elements 117 is mounted in a bushing 119 and is constrained thereby to move solely in a direction strictly parallel to the axis of the centers 75 or 85. This prevents the imposition of lateral or radial stresses to the work piece and permits a relatively great clamping force to be applied thereto in directions strictly parallel to the axis of the work piece.

It is further important to note that the structure thus defined provides a rigid support for the pins 117. This is to be contrasted to an arrangement in which the pins 117 are spring pressed. A plurality of springs 120 are provided intermediate the forward face of the backing plate 105 and the rear face of the face plate portion 112. The springs are retained in aligned recesses, as well illustrated in Figure 8, and serve the purpose of retaining the swiveled backing plate 105 on its seat provided by the member 102.

Inasmuch as the three work-engaging elements 117 are backed up by a rigid swivel plate 105 and since their movement is constrained by the bushings 119 to axial movement with respect to the spindles 75 and 85, pins or elements 117 may engage substantially irregular side surfaces of the work piece in firm gripping and driving relationship.

The work-engaging elements or pins 117 are in effect rigidly tied together by the rigid backing plate 105 so that as they engage a work piece the movement of any one of the elements 117 is definitely related to the movement of the other elements. This movement is referred to herein as complemental movement, since movement of one of the elements by a predetermined amount inwardly results in a definite outward movement of the other two elements, or conversely, movement of two of the elements to any definite position definitely predetermines the position of the other element. Thus the force applied to each of the pins to effect driving engagement between the pin and the work piece is equalized without at the same time resulting in the creation of any side or radial stresses.

In order that a complete understanding may be had of the operation of a tried and tested adaptation of the present invention, there has been presented a complete description of the essential operating parts of a complete machine.

However, it is stressed that the present invention is not limited to the type of machine illustrated but instead is equally well adapted for use with any type of machine tool in which problems are encountered in locating and driving a work piece, and more particularly where it is desired to leave the entire periphery of the work piece free for a machining operation which may be completed in a single pass. Thus, for example, in the present machine the means for locating the work piece in accurately predetermined position comprises the center pins 93 which engage the ends of the work shaft Wa. In many cases the work piece will not have axially projecting shafts. In such case, the centers may engage locating recesses which are provided in the side surfaces of the work piece or even within the body of the work piece. It is further recognized that a work piece may be located by entirely different means. Thus, for example, if a work piece is originally machined to have an accurate locating surface formed by its periphery, it may be initially located in working position by resting on a V block and while so supported the work-engaging and driving pins or elements may be brought into engagement with the end surface thereof and firmly clamped thereto, after which the V block may be lowered with respect to the work piece.

Essentially the present invention is characterized by the use of a plurality of work-engaging elements whose movement is constrained to axial movement only with respect to the spindles in conjunction with rigid means for assuring complemental movement thereof as defined herein.

Accordingly, while there has been illustrated and described in detail a complete work driving portion of a machine tool, it will be appreciated that this full illustration and description has been given merely to enable those skilled in the art to appreciate and practice the present invention, the true scope of which is indicated by the appended claims.

What we claim as our invention is:

1. Rotary work supporting and driving tooling comprising a rotary drive plate, a plurality of work-engaging elements carried by said drive plate and spaced from and around the axis of rotation of said plate, said elements being independently movable toward and away from a work piece, means on said plate effective to limit movement of said elements to a direction parallel to the axis of rotation of said plate, and equalizing means acting on said elements effective to equalize the pressure with which said elements engage a work piece.

2. Tooling as defined in claim 1 in which the number of said elements is divisible by three.

3. Tooling as defined in claim 1 in which said elements are three in number.

4. Tooling as defined in claim 3 in which said plate is provided with guide openings and said elements are slidable in said openings.

5. Tooling as defined in claim 4 in which said equalizing means comprises a rigid member engaging the ends of said elements extending rearwardly from said drive plate, and a universal pivot support for said member.

6. Tooling as defined in claim 5, said rigid member having a flat forward surface slidably engaging the rear ends of said elements, and said pivot support comprising a spheroidal portion on said rigid member with its center on said flat forward surface, and a concave seat for said spheroidal portion, said seat being of circular cross-section.

7. Tooling as defined in claim 6 in which said seat is conical.

8. Tooling as defined in claim 7, comprising compression springs interposed between said member and plate to retain said member on said seat.

9. Work supporting and driving tooling comprising a pair of stocks, means for moving said stocks toward and away from each other to effect clamping and release of a work piece, each of said stocks comprising a rotary member, a plurality of independently movable work-engaging elements on said member spaced from and about the axis of rotation thereof, means on said rotary members constraining said elements to movement parallel to said axis of rotation, equalizing means on each of said stocks to equalize the pressure with which said elements engage a work piece, and locating means for locating a work piece with its axis in alignment with the axis of rotation of said rotary members prior to engagement between said elements and the work piece.

10. Tooling as defined in claim 9, said equalizing means comprising a rigid plate in each of said stocks rotatable with said rotary member and slidably engaging the work-engaging elements carried thereby, and a universal pivot support in each of said stocks for mounting the plate thereon, the pivot center of said pivot support being located in a plane containing the parts of said elements slidably engaging the plate.

11. Tooling as defined in claim 9 in which said locating means comprises a yieldable center carried by each of said stocks, with its axis aligned with the axis of rotation of said rotary members, means in said stocks mounting said centers for movement axially thereof, and resilient means in said stocks urging said centers forwardly.

12. Tooling as defined in claim 11, said tooling including a work receiver intermediate said stocks, means on said receiver for supporting a rotary work piece slightly below centered position with respect to the axes of rotation of said rotary members, whereby said centers raise a work piece from the receiver into centered position, and thereafter said work-engaging elements engage end surfaces thereof upon inward movement of said stocks.

13. Tooling as defined in claim 12, said work receiver comprising a pair of inclined rails, a releasable stop on said rails cooperating therewith to determine initial location of a work piece, said stop being movable to a position permitting rolling of a finished work piece away from working position upon release from said stocks.

14. Work locating and driving means comprising a work spindle, an equalizer seat member at the end of said spindle having an outwardly convex conical seat, a face plate carried by said spindle forwardly of said seat member, an equalizer plate having a spheroidal rear portion located in said conical seat and a flat front surface located rearwardly of said face plate, said face plate having three openings therethrough spaced equally from and about the axis of said spindle, said openings extending parallel to the axis of said spindle, work engaging pins extending through said openings and slidably engaging the flat front surface of said equalizer plate, the center of said spheroidal surface being located on the flat front surface of said equalizer plate and on the axis of said spindle.

15. The structure as defined in claim 14 which comprises in addition a locating center, means mounting said center for longitudinal movement axially of said spindle, and resilient means engaging said center and permitting rearward yielding of said center relative to said shaft.

16. The structure as defined in claim 15 in which said face plate has an axial opening therethrough, and the forward end of said center is located rearwardly of said cover plate.

17. Means for supporting a work piece for rotation and for engaging the suface of the work piece at a plurality of points spaced substantially from the axis of the work piece, comprising: a body, a work-engaging center carried by said body, a compensating member carried by said body, means mounting said center and member for relative movement axially of the body, a plurality of work-engaging parts carried by said body, means mounting said parts for independent movement and constructed and arranged to limit the movement of each of said parts to a direction perpendicular to the adjacent surface of the work piece, universal support means for said compensating member providing for universal movement thereof about a point on the axis of said center, and rigid thrust transmitting means interposed between said parts and said compensating member at points thereon spaced equidistant from its center of universal movement.

18. Structure as defined in claim 17 in which said parts are three in number and are located substantially 120 degrees apart from each other about the axis of said center.

19. Rotary work supporting and driving tooling comprising a rotary drive plate, a plurality of work-engaging elements carried by said drive plate and spaced from and around the axis of rotation of said plate, the number of said elements being divisible by three, said elements being independently movable toward and away from a work piece, means on said plate effective to limit movement of said elements to a direction parallel to the axis of rotation of said plate, equalizing means acting on said elements effective to equalize the pressure with which said elements engage a work piece, a locating center located on the axis of rotation of said drive plate and relatively axially movable with respect to said equalizing means, and spring means in said tooling effective to resist relative axial movement between said center and said elements.

20. Tooling as defined in claim 19 in which said spring means is operatively connected to said center to oppose rearward yielding movement thereof.

21. Tooling as defined in claim 19, said center being located rearwardly of said plate, and said plate having an opening therethrough in alignment with said center to permit passage therethrough of an axially extending portion of a work piece.

DONALD D. AUSTIN, Sr.
KENNETH J. DAVIS.

REFERENCES CITED

The following references are of record in the file of this patent:

UNITED STATES PATENTS

| Number | Name | Date |
| --- | --- | --- |
| 1,361,120 | Weatherby | Dec. 7, 1920 |
| 1,582,639 | Cullen | Apr. 27, 1926 |
| 1,602,680 | Knowles | Oct. 12, 1926 |
| 1,829,619 | Svenson | Oct. 27, 1931 |
| 1,914,984 | Smith | June 20, 1933 |
| 1,936,401 | Lovely | Nov. 21, 1933 |
| 2,248,168 | Gleason | July 8, 1941 |
| 2,249,148 | Lovely et al. | July 15, 1941 |